Figure 1:
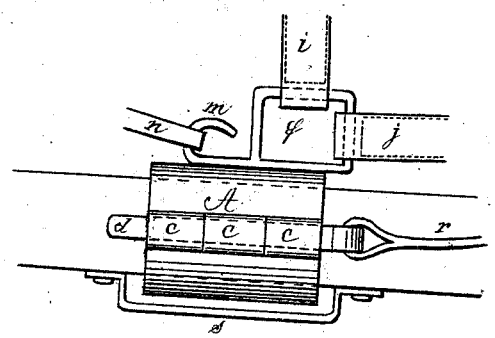
Figure 2:
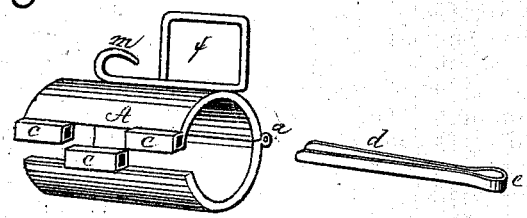

J. V. RAGON.
Shaft-Tugs.

No. 146,203. Patented Jan. 6, 1874.

Witnesses:
Fred. W. Wilson
P. W. Hall

Inventor:
John V. Ragon
by Chas. E. Bishop,
his Atty

UNITED STATES PATENT OFFICE.

JOHN V. RAGON, OF GREENVILLE, KENTUCKY.

IMPROVEMENT IN SHAFT-TUGS.

Specification forming part of Letters Patent No. 146,203, dated January 6, 1874; application filed November 25, 1873.

*To all whom it may concern:*

Be it known that I, JOHN V. RAGON, of Greenville, in the county of Muhlenburg and State of Kentucky, have invented certain Improvements in Shaft-Tugs, of which the following is a specification:

My invention relates to an improvement in shaft-tugs, by inclosing the shaft in a hinged barrel, with loops on the outside, through which passes a double spring, from rear to front, with a loop in the rear, to which is fastened a line, which passes to the driver, to enable him to open the barrel at will, and instantly detach the horse from the vehicle.

Figure I represents a side view of a shaft-tug embodying my invention, inclosing the shaft, fastened with the double spring, and line connecting therewith passing to the rear. Fig. II represents a perspective view of the shaft-tug, the barrel partly opened, and double spring withdrawn.

A is a metallic barrel, with hinges $a$ $a$ and loops $c$ $c$ $c$, through which passes a double spring, $d$, with loop $e$. By withdrawing the double spring the barrel opens on its hinges. On top it has a square, $f$, to which are fastened the saddle or back-band $i$ and breeching $j$, and in front is a hook, $m$, to which is attached the hame-band $n$. To the spring $d$ is attached a line, $r$, which passes to the driver. By pulling this line the spring is withdrawn from the loops, and the barrel instantly opens, permitting the shaft to drop to the ground, thereby freeing the horse from the vehicle. Underneath, a loop, $s$, is attached to the shaft to prevent the shaft-tug from moving back and forth.

I claim as my invention—

The hinged barrel A, having square $f$, hook $m$, and loops $c$ $c$, in combination with double spring $d$, as described, and for the purposes set forth.

JOHN V. RAGON.

Witnesses:
 SAML. E. SMITH,
 M. J. ROARK.